United States Patent
Liu et al.

(10) Patent No.: US 11,240,722 B2
(45) Date of Patent: Feb. 1, 2022

(54) HANDOVER METHOD AND DEVICE AND COMPUTER STORAGE MEDIUM

(71) Applicant: GUANGDONG OPPO MOBILE TELECOMMUNICATIONS CORP., LTD., Guangdong (CN)

(72) Inventors: Jianhua Liu, Guangdong (CN); Ning Yang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/929,377

(22) Filed: Jul. 15, 2020

(65) Prior Publication Data

US 2020/0351742 A1    Nov. 5, 2020

Related U.S. Application Data

(63) Continuation of application No. PCT/CN2018/072900, filed on Jan. 16, 2018.

(51) Int. Cl.
*H04W 4/00* (2018.01)
*H04W 36/14* (2009.01)

(52) U.S. Cl.
CPC .................. *H04W 36/14* (2013.01)

(58) Field of Classification Search
CPC ..... H04W 36/14; H04W 88/06; H04W 36/00; H04W 36/0011; H04W 36/18
USPC .................. 370/331; 455/312–316, 436–444
See application file for complete search history.

(56) References Cited

U.S. PATENT DOCUMENTS

| | | | |
|---|---|---|---|
| 8,331,323 B2 | 12/2012 | Zhong | |
| 2009/0124259 A1 | 5/2009 | Attar | |
| 2011/0019609 A1 | 1/2011 | Zhong | |
| 2011/0149905 A1 | 6/2011 | Kim | |
| 2012/0320733 A1* | 12/2012 | Zhao | H04W 76/20 370/216 |
| 2016/0057663 A1 | 2/2016 | Teyeb et al. | |
| 2019/0182762 A1* | 6/2019 | Mutikainen | H04W 76/16 |

FOREIGN PATENT DOCUMENTS

| | | |
|---|---|---|
| CN | 101547483 A | 9/2009 |
| CN | 102045799 A | 5/2011 |
| CN | 106937347 A | 7/2017 |
| CN | 107529199 A | 12/2017 |
| WO | 2009021214 A2 | 2/2009 |

(Continued)

OTHER PUBLICATIONS

International Search Report in the international application No. PCT/CN2018/072900, dated Sep. 27, 2018.

(Continued)

*Primary Examiner* — Marcos Batista

(57) ABSTRACT

A Handover (HO) method and device and a computer storage medium are disclosed. The method includes that: a first Radio Access Network (RAN) element determines to keep a connection between a first RAN and a first Core Network (CN) during the process of the handover of User Equipment (UE) from the first RAN to a second RAN according to first information or a received first message; and the first RAN element receives data of the UE forwarded by a second RAN element, and sends the data to a first CN element.

18 Claims, 8 Drawing Sheets

(56) References Cited

FOREIGN PATENT DOCUMENTS

| WO | 2012103792 A1 | 8/2012 |
|---|---|---|
| WO | 2014082269 A1 | 6/2014 |

OTHER PUBLICATIONS

China Mobile et al: "Proposals for RRC connection release with redirection for Connected Mobility for IWK", 3GPP Draft; S2-178371 Proposals for Proposals for RRC Connection Release With Redirection for Connected Mobility for IWK-R2. 3rd Generation Partnership Project(3GPP), Mobi le Competence Centre; 650, vol. SA VG2, No. Reno, USA; Nov. 27, 2017-Dec. 1, 2017, Nov. 21, 2017 (Nov. 21, 2017), XP051367046, [retrieved on Nov. 21, 2017] p. 5.
Huawei: "Clarification of description without N26 interface", 3GPP Draft; S2-175562 Clarification of Descripiton Without N26 Interface V12, 3rd Generation Partnership Project (3GPP), Mobile Competence Centre; 650, Route Des Lucioles; F-06921 Sophia-Antipolis C, vol. SA WG2, No. Sophia Antipolis, France; Aug. 21-25, 2017, Aug. 21, 2017 (Aug. 21, 2017), XP051325413, Retrieved from the Internet: URL: http://www.3gpp. org/ftp/Meetings_3GPP_SYNC/SA2/Docs/[retrieved on Aug. 21, 2017].
Supplementary European Search Report in the European application No. 18900988.9, dated Oct. 8, 2020.
English translation of the Written Opinion of the International Search Authority in the international application No. PCT/CN2018/072900, dated Sep. 27, 2018.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)" 3GPP TS 36.300 V13.2.0 (Dec. 2015),http://www.3gpp.org.
"3rd Generation Partnership Project; Technical Specification Group Services and System Aspects; System Architecture for the 5G System; Stage 2 (Release 15)" 3GPP TS 23.501 V1.0.0 (Jun. 2017),http://www.3gpp.org.
SA WG2 "Presentation of TR 23.501: System Architecture for the 5G System (Release 15) to TSG SA for Approval" 3GPP TSG SA Meeting #76 TD SP-170384, Jun. 7-9, 2017, West Palm Beach, Florida, USA.

\* cited by examiner

HANDOVER METHOD AND DEVICE AND COMPUTER STORAGE MEDIUM

CROSS-REFERENCE TO RELATED APPLICATION

The present disclosure is a U.S. continuation application of International Application No. PCT/CN2018/072900, filed on Jan. 16, 2018. The contents of this application are incorporated herein by reference in its entirety.

BACKGROUND

In a Next Generation (NG) system, there may be such a scenario that a next generation NodeB (gNB) and an Evolved Node B (eNB) simultaneously access or respectively access a 5th-Generation (5G) Core Network (CN) for a Radio Access Network (RAN), as shown in FIG. 1. For the gNB (for example, a 5G RAN in FIG. 1), if a target Identifier (ID) in a HO require message sent to a Core Access and Mobility Management Function (AMF) is an eNB ID and the eNB accesses both the 5G CN and an Evolved Packet Core (EPC), the AMF may not judge whether to perform Radio Access Technology (RAT) HO (namely the 5G CN does not change and a base station changes from the gNB to the eNB) or system HO (namely a CN changes from the 5G CN to the EPC) at present.

In addition, if system HO is required, it is necessary to execute a HO flow of HO from the 5G CN to the EPC, and similarly, in case of HO from the EPC to the 5G CN, it is also necessary to execute a corresponding HO flow. The CN HO flow is relatively high in time consumption, which may bring the shortcomings of interruption, relatively long delay or the like to a service.

SUMMARY

The disclosure relates to the technical field of wireless communication, and particularly to a Handover (HO) method and device and a computer storage medium.

For solving the technical problem, embodiments of the disclosure provide a HO method and device and a computer storage medium.

The embodiments of the disclosure provide a HO method, which may include the following operations.

A first RAN element determines, according to first information or a received first message, to keep, during the process of the handover of UE from a first RAN to a second RAN, a connection between the first RAN and a first CN.

The first RAN element receives data of the UE forwarded by a second RAN element, and sends the data to a first CN element.

The embodiments of the disclosure provide a HO device, which may include a processor, a memory configured to store data and a transceiver configured for a communication function.

The processor may be configured to determine, according to first information or a received first message, to keep, during the process of the handover of a User Equipment (UE) from a first Radio Access Network (RAN) to a second RAN, a connection between a first RAN and a first CN.

The transceiver may be configured to receive data of the UE forwarded by a second RAN element, and send the data to a first CN element.

The embodiments of the disclosure provide a computer storage medium, in which computer-executable instructions may be stored, the computer-executable instructions being executed by a processor to implement the HO method.

BRIEF DESCRIPTION OF THE DRAWINGS

The drawings described herein are adopted to provide a further understanding to the disclosure and form a part of the application. Schematic embodiments of the disclosure and descriptions thereof are adopted to explain the disclosure and not intended to form improper limits to the disclosure. In the drawings.

DETAILED DESCRIPTION

In the technical solutions of the embodiments of the disclosure, the first RAN element determines to keep the connection between the first RAN and the first CN during the process of the handover of the UE from the first RAN to the second RAN according to the first information or the received first message; and the first RAN element receives the data of the UE forwarded by the second RAN element, and sends the data to the first CN element. With adoption of the technical solutions of the embodiments of the disclosure, cross-core network-element handover is avoided, a service of the UE may be forwarded through a source RAN element (i.e., the first RAN element) on a target RAN element side (i.e., the second RAN element) for sending to a source CN element (i.e., the first CN element), and a HO flow between CN elements is not needed to be executed, so that a service delay is reduced, and a user experience is improved.

For making the technical solutions of the embodiments of the disclosure convenient to understand, related technologies involved in the embodiments of the disclosure will be described below.

A HO flow will be described below in combination with whether there is an N26 interface between an EPC and a 5G CN or not.

1) There is an N26 interface between the EPC and the 5G CN.

Figure 1:
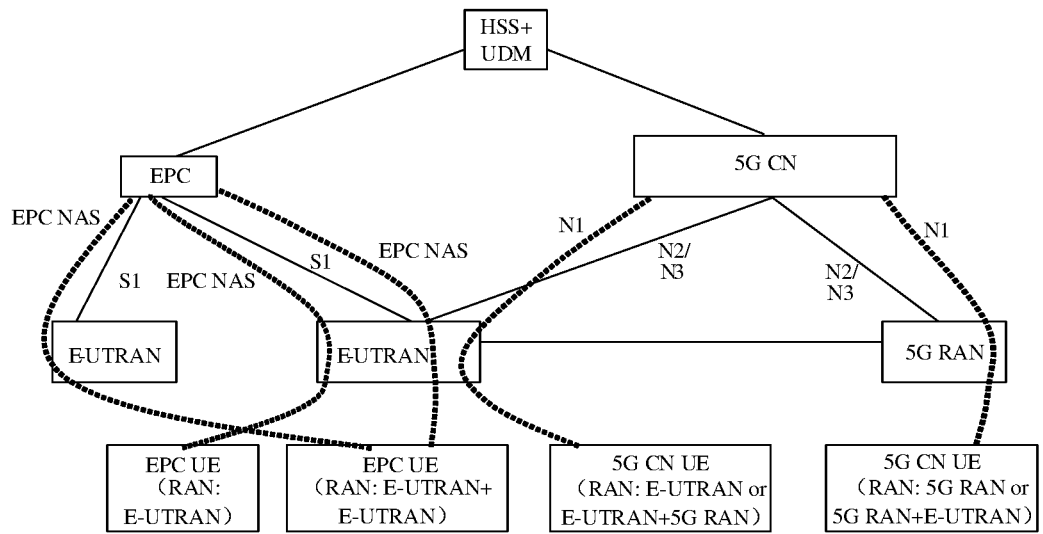
FIG. 1 illustrates a connecting structure diagram of a RAN and a CN in NG.
Figure 2:
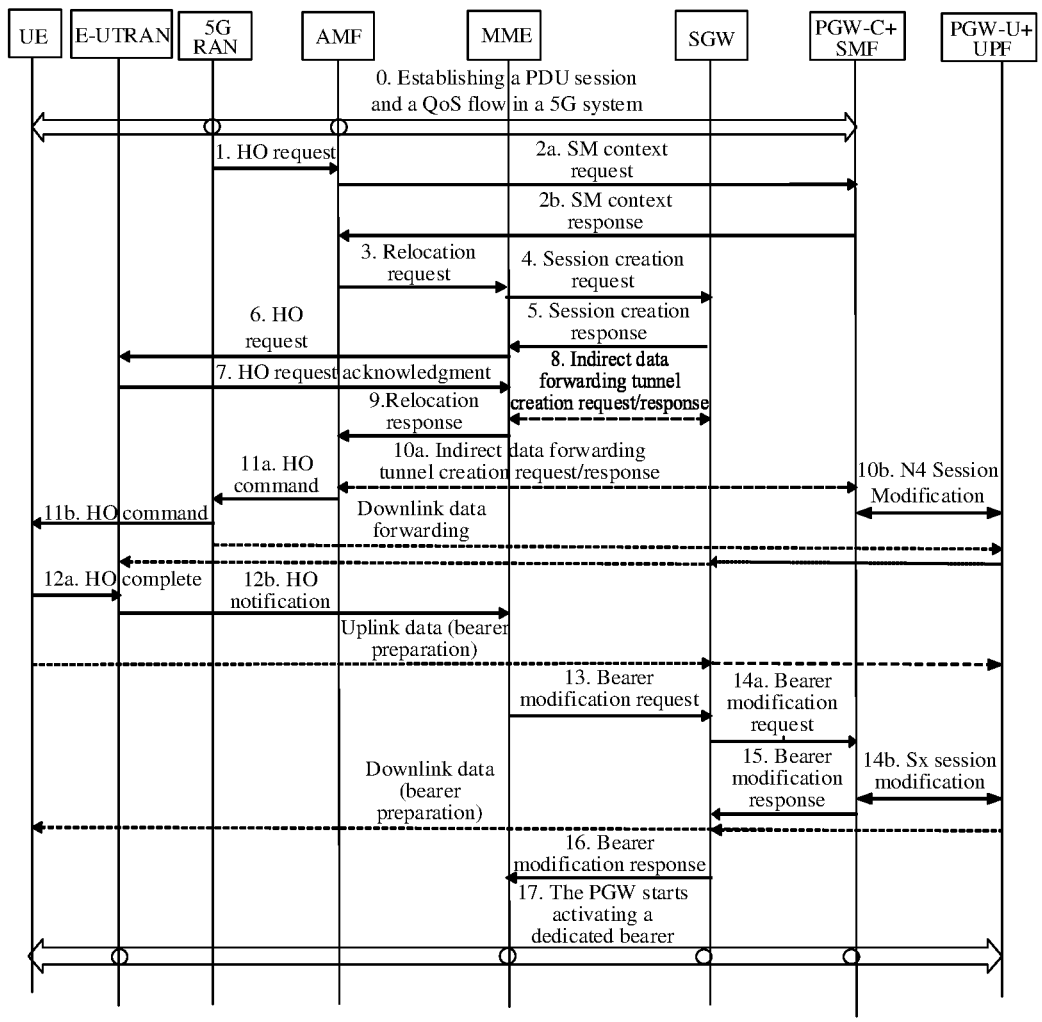
FIG. 2 illustrates a flowchart of system HO (namely a CN changes from a 5G CN to an EPC) in a connected-state scenario.
Figure 3:
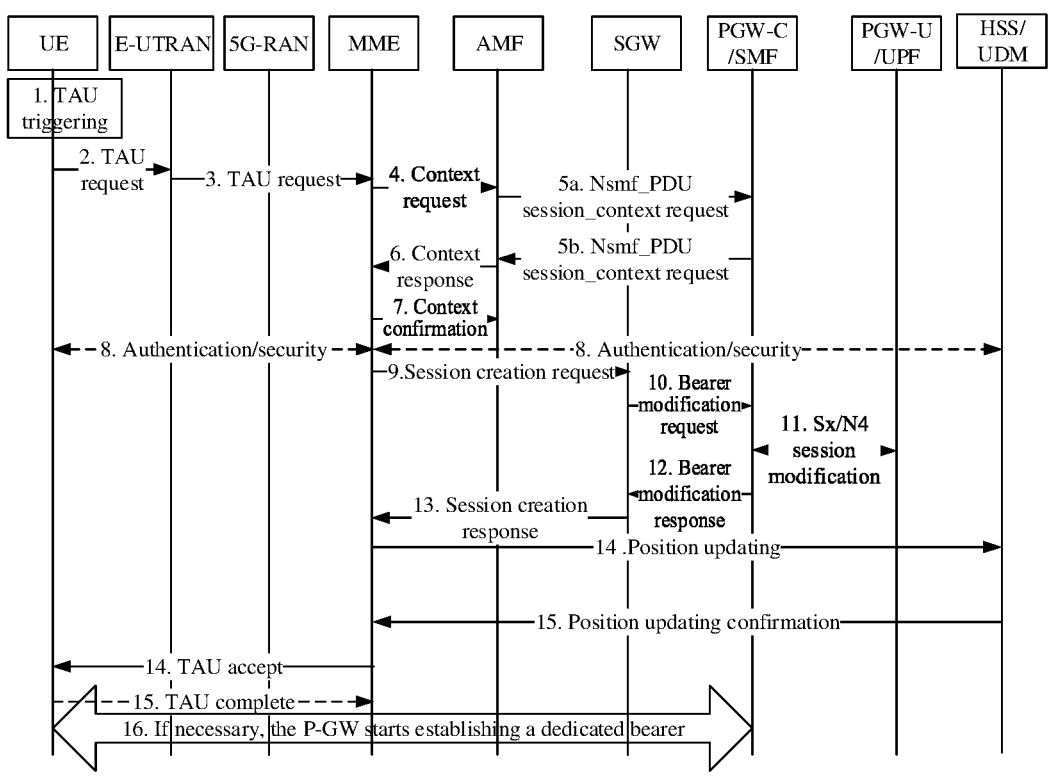
FIG. 3 illustrates a flowchart of system HO (namely a CN changes from a 5G CN to an EPC) in an idle-state scenario.

FIG. 2 is a flowchart of system HO (namely a CN changes from a 5G CN to an EPC) in a connected-state scenario. FIG. 3 is a flowchart of system HO (namely a CN changes from a 5G CN to an EPC) in an idle-state scenario. Each network element involved in FIG. 2 and FIG. 3 are explained as follows.

UE refers to User Equipment.

E-UTRAN refers to Evolved Universal Terrestrial Radio Access Network.

5G-RAN refers to 5G Radio Access Network.

AMF refers to Core Access and Mobility Management Function.

MME refers to Mobility Management Entity.

SGW refers to Serving GateWay.

PGW-C refers to Packet Data Network GateWay-Control plane.

SMF refers to Session Management Function.

PGW-U refers to Packet Data Network GateWay-User plane.

UPF refers to User Plane Function.

As shown in FIG. 2, if the UE is in a connected state, the 5G-RAN determines a HO triggering opportunity according to a measurement threshold value. The 5G-RAN, responsive to determining to trigger HO, may send an HO request command to the AMF of a 5G CN (i.e., Step 1), a 5G CN side may prepare a resource with a 4th-Generation (4G) CN side, and then the 5G-RAN sends an HO command to the UE (i.e., Step 11b), thereby handing over the UE to a 4G network.

As shown in FIG. 3, if the UE is in an idle state, the UE sends a Tracking Area Update (TAU) request to the MME of the 4G CN, and the MME is responsible for obtaining related context information from the 5G CN and completing a position updating flow in the 4G CN.

2) There is no N26 interface between the EPC and the 5G CN.

Figure 4:
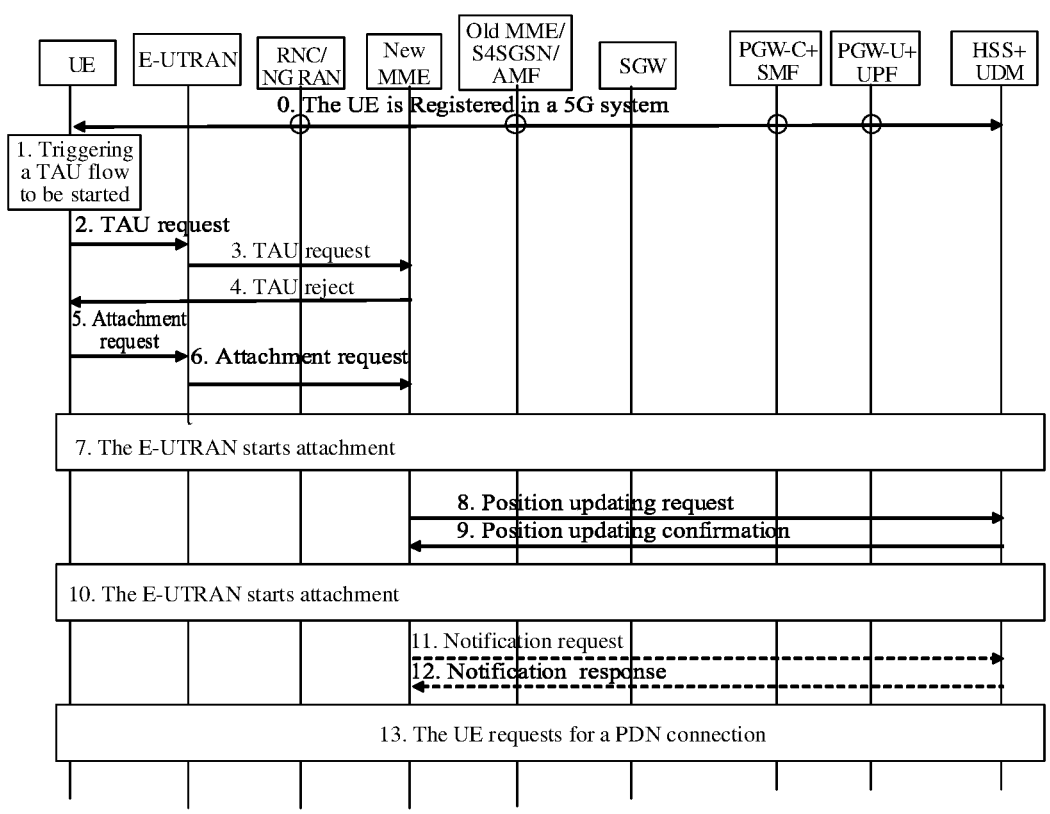
FIG. 4 illustrates a flowchart of HO in case of no N26 interface between an EPC and a 5G CN.

FIG. 4 is a flowchart of HO in case of no N26 interface between an EPC and a 5G CN.

At present, under the condition of cross-system handover between the 5G CN and the EPC, if there is no N26 interface between the EPC and the 5G CN, two behaviors of the UE are specified.

1) As shown in FIG. 4, if the UE may recognize an indication that "N26-free HO is supported" sent by a network side, the UE may execute a procedure of Attach with Handover Flag, an Access Point Name (APN)/Data Network Name (DNN) corresponding to a Protocol Data Unit (PDU) session in a 5G system being contained (Step 5 in FIG. 4). The attachment request message may trigger the network side to search corresponding combined network elements SMF+PGW-C, UPF+PGW-U and PCF+PCRF according to the APN/DNN for the UE, so that the combined network elements obtain a 4G Session Management (SM) context by mapping, thereby achieving consistency of an Internet Protocol (IP) address of the session.

2) As shown in FIG. 4, if the UE does not recognize the indication that "N26-free HO is supported" sent by the network side, a TAU request is directly performed (Step 1 and Step 2 in FIG. 4). In such case, if the network side does not support the N26 interface, the network side may send a TAU reject message to the UE, and then the UE may initiate an ordinary attachment flow. Under this condition, consistency of the IP address of the session may not be ensured.

The embodiments of the disclosure disclose a HO method. When UE moves from the coverage of a first CN element to the coverage of a second CN element, an original connection between the first CN element and a first RAN element is kept, and data is forwarded between the UE and a CN through the first RAN element.

In the following technical solutions of the embodiments of the disclosure, the first RAN element refers to a source RAN element accessed by the UE, and a second RAN element refers to a target RAN element accessed by the UE. The first CN element refers to a CN element connected with the first RAN element, and the second CN element refers to a CN element connected with the second RAN element.

In an implementation mode, the first CN element may be an EPC, and the second CN element may be a 5G CN. Of course, the first CN element may be the 5G CN, and the second CN element may be the EPC.

In an implementation mode, the first RAN element serving as the source RAN element may be an eNB, and the second RAN element may be a gNB. Of course, the first RAN element may be the gNB, and the second RAN element may be the eNB.

Figure 5:
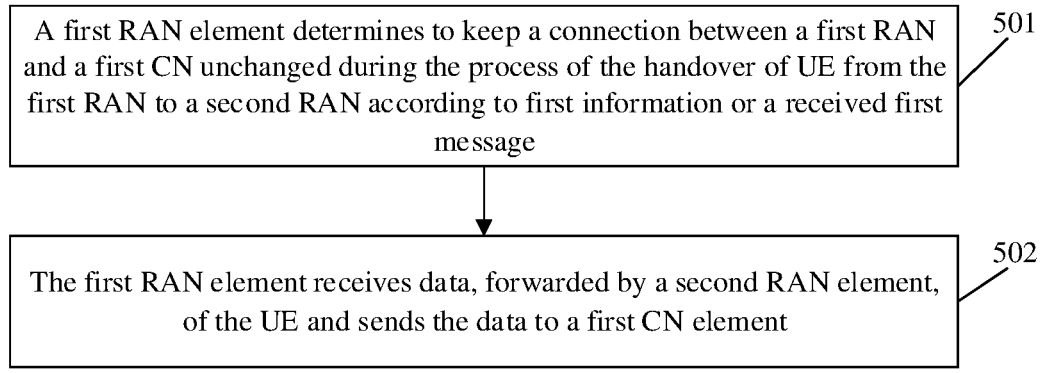
FIG. 5 illustrates a first flowchart of a HO method according to embodiments of the disclosure.

FIG. 5 is a first flowchart of a HO method according to embodiments of the disclosure. As shown in FIG. 5, the HO method includes the following operations.

In 501, a first RAN element determines to keep a connection between a first RAN and a first CN during the process of the handover of UE from the first RAN to a second RAN according to first information or a received first message.

Before 501, the first RAN element receives a Measurement Report (MR) sent by the UE and determines based on the MR that CN HO is required.

In the embodiments of the disclosure, for ensuring a delay requirement of a service, CN HO is not needed to be executed in some scenarios, namely the connection between the first RAN and the first CN is kept during the process of the handover of the UE from the first RAN to the second RAN. It may be determined that CN HO is not needed through the following manners.

A first manner: the first RAN element determines to keep the connection between the first RAN and the first CN during the process of the handover of the UE from the first RAN to the second RAN according to at least one of capability information of the UE or capability information of the second RAN element.

A second manner: the first RAN element sends a first HO request message such that a first CN element determines to keep the connection between the first RAN and the first CN during the process of the handover of the UE from the first RAN to the second RAN according to a service type of the UE; and the first RAN element determines to keep the connection between the first RAN and the first CN during the process of the handover of the UE from the first RAN to the second RAN based on a HO feedback message from the first CN element.

In an implementation mode, the first RAN element sends the first HO request message to the first CN element.

In an implementation mode, if the first CN element determines that the second CN element does not support the service type of the UE, the connection between the first RAN and the first CN is determined to be kept during the process of the handover of the UE from the first RAN to the second RAN.

A third manner: the first RAN element sends the first HO request message such that a second CN element determines to keep the connection between the first RAN and the first CN during the process of the handover of the UE from the first RAN to the second RAN according to a service type of the UE; and the first RAN element determines to keep the connection between the first RAN and the first CN during the process of the handover of the UE from the first RAN to the second RAN based on a HO feedback message from the second CN element.

In an implementation mode, the first RAN element sends the first HO request message to the second CN element or sends the first HO request message to the second CN element through the first CN element.

In an implementation mode, if the second CN element determines that the second CN element does not support the service type of the UE, the connection between the first RAN and the first CN is determined to be kept during the process of the handover of the UE from the first RAN to the second RAN.

A fourth manner: the first RAN element sends a second HO request message, the second HO request message containing instruction information for instructing the connection between the first RAN and the first CN to be kept during the process of the handover of the UE from the first RAN to the second RAN, such that the second CN confirms the second HO request message and feeds back a HO request acknowledgment message; and the first RAN element determines to keep the connection between the first RAN and the first CN during the process of the handover of the UE from the first RAN to the second RAN based on the HO request acknowledgment message.

In an implementation mode, the first RAN element sends the second HO request message to the second CN element or sends the second HO request message to the second CN element through the second RAN element.

In an implementation mode, the HO request ACK contains a resource allocated to the UE by the second RAN element.

The embodiment of the disclosure further includes the following operations.

The first RAN element sends a HO command to the UE, and the UE, after completing handover from the first RAN to the second RAN, sends a HO completion message to the second RAN.

The first RAN element receives a HO confirmation message sent by the second RAN element.

Then, the UE establishes a connection with the second RAN element and executes the following 502.

In 502, the first RAN element receives data of the UE forwarded by a second RAN element, and sends the data to a first CN element.

The technical solution of the embodiments of the disclosure will further be described below in combination with a specific application example.

Figure 6:
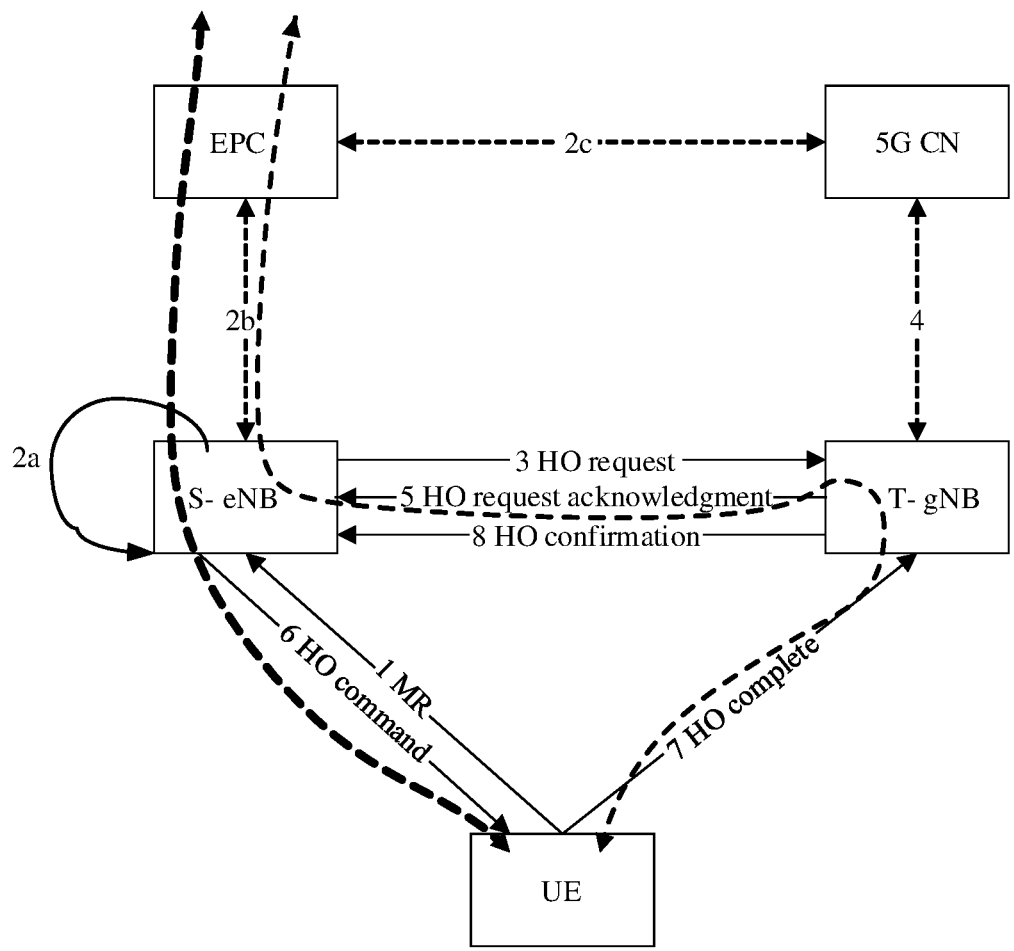
FIG. 6 illustrates a second flowchart of a HO method according to embodiments of the disclosure.

FIG. 6 is a second flowchart of a HO method according to embodiments of the disclosure. As shown in FIG. 6, the HO method includes the following operations.

In 1, UE performs measurement for a neighbor cell and, when an MR reporting condition preset by a network is met, reports an MR to an S-eNB.

Herein, the S-eNB is a source RAN element of the UE.

The S-eNB, after receiving the MR sent by the UE, determines according to the MR that system HO is required.

In 2a, the S-eNB determines not to change a CN of the UE according to capability information of the UE or capability information of a T-gNB. Or, in 2b, the S-eNB sends a HO request message to an EPC, identification information of the T-gNB being contained; and after the EPC receives the HO request message of the S-eNB, the EPC determines not to change the CN of the UE according to a service type created by the UE, for example, a low-latency service, or a voice service or any service that is not supported by a 5G CN, and feeds back a result to the S-eNB. Or, in 2b+2c, the S-eNB sends the HO request message to the EPC; the EPC sends the HOT request to the 5G CN; and after the 5G CN receives the HO request message of the EPC, the 5G CN determines not to change the CN of the UE according to the service type, for example, the low-latency service, or the voice service or any service that is not supported by the 5G CN, and feeds back the result to the EPC and the S-eNB. Or, in 3+4+5, the S-eNB sends the HO request message to the T-gNB, indication information indicating that the CN of the UE is not changed being contained; the T-gNB notifies the 5G CN not to change the CN of the UE, and the 5G CN confirms not to change the CN of the UE; and the T-gNB sends a HO request acknowledgment message to the S-eNB, resource information allocated to the UE by the T-gNB being contained.

In the solution, the CN of the UE may be determined not to be changed in 2a, 2b, 2b+2c or 3+4+5.

In 6, the S-eNB sends a HO command to the UE.

In 7, the UE sends a HO completion message to the T-gNB.

In 8, the T-gNB sends a HO confirmation message to the S-eNB.

Figure 7:
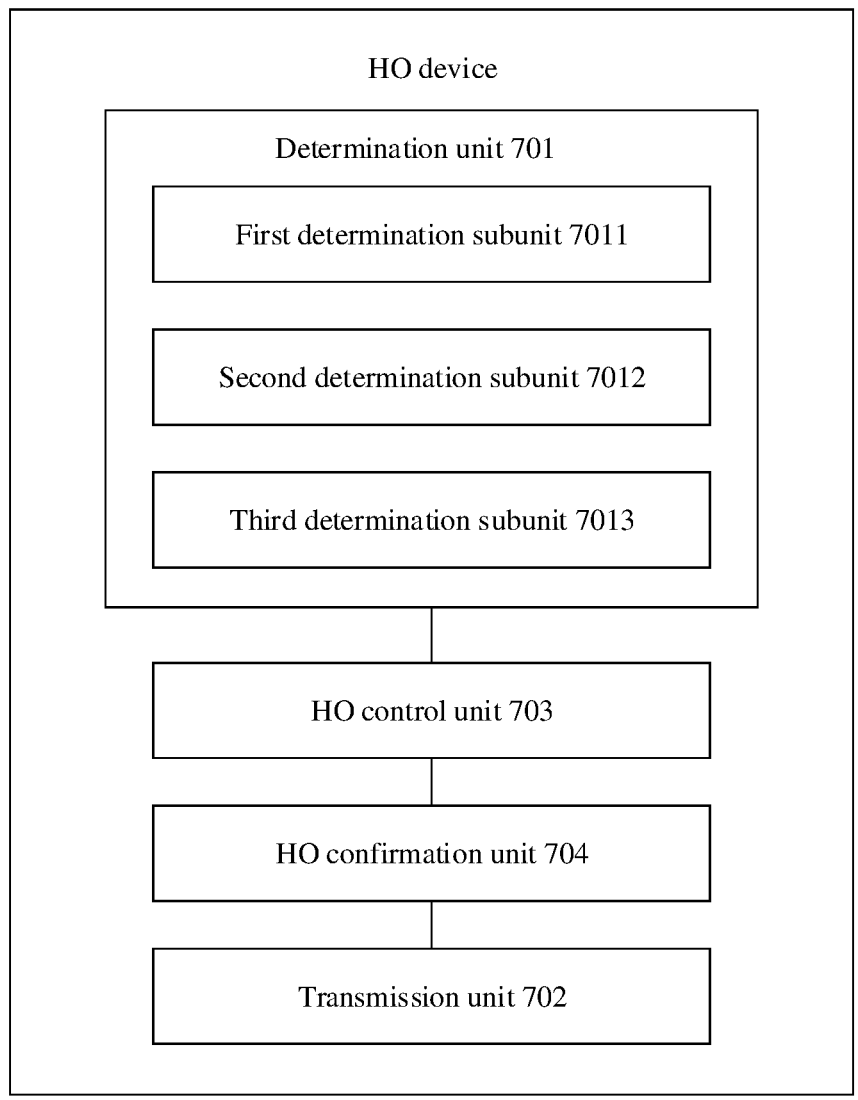
FIG. 7 illustrates a structure composition diagram of a HO device according to embodiments of the disclosure.

FIG. 7 is a structure composition diagram of a HO device according to embodiments of the disclosure. As shown in FIG. 7, the HO device includes a determination unit 701 and a transmission unit 702.

The determination unit 701 is configured to determine to keep a connection between a first RAN and a first CN during the process of the handover of UE from the first RAN to a second RAN according to first information or a received first message.

The transmission unit 702 is configured to receive data of the UE forwarded by a second RAN element, and send the data to a first CN element.

In an implementation mode, the determination unit 701 includes a first determination subunit 7011.

The first determination subunit 7011 is configured to determine to keep the connection between the first RAN and the first CN during the process of the handover of the UE from the first RAN to the second RAN according to at least one of capability information of the UE or capability information of the second RAN element.

In an implementation mode, the determination unit 701 includes a second determination subunit 7012.

The second determination subunit 7012 is configured to send a first HO request message such that the first CN element or a second CN element determines to keep the connection between the first RAN and the first CN during the process of the handover of the UE from the first RAN to the second RAN according to a service type of the UE, and determine to keep the connection between the first RAN and the first CN during the process of the handover of the UE from the first RAN to the second RAN based on a HO feedback message from the first CN element or the second CN element.

In an implementation mode, the operation that the first CN element or the second CN element determines to keep the connection between the first RAN and the first CN during the process of the handover of the UE from the first RAN to the second RAN according to the service type of the UE includes the following operation.

If the first CN element or the second CN element determines that the second CN element does not support the service type of the UE, the connection between the first RAN and the first CN is determined to be kept during the process of the handover of the UE from the first RAN to the second RAN.

In an implementation mode, if the first CN element determines to keep the connection between the first RAN and the first CN during the process of the handover of the UE from the first RAN to the second RAN according to the service type of the UE, the second determination subunit 7012 is configured to send the first HO request message to the first CN element.

In an implementation mode, if the second CN element determines to keep the connection between the first RAN and the first CN during the process of the handover of the UE from the first RAN to the second RAN according to the service type of the UE, the second determination subunit 7012 is configured to send the first HO request message to the second CN element or send the first HO request message to the second CN element through the first CN element.

In an implementation mode, the determination unit 701 includes a third determination subunit 7013.

The third determination subunit 7013 is configured to send a second HO request message, the second HO request message containing instruction information instructing the connection between the first RAN and the first CN to be kept during the process of the handover of the UE from the first RAN to the second RAN, such that the second CN confirms the second HO request message and feeds back a HO request acknowledgment message, and determine to keep the connection between the first RAN and the first CN during the process of the handover of the UE from the first RAN to the second RAN based on the HO request acknowledgment message.

In an implementation mode, the third determination subunit 7013 is configured to send the second HO request message to the second CN element or send the second HO request message to the second CN element through the second RAN element.

In an implementation mode, the HO request ACK contains a resource allocated to the UE by the second RAN element.

In an implementation mode, the device further includes a HO control unit 703 and a HO confirmation unit 704.

The HO control unit 703 is configured to send a HO command to the UE, and the UE, after completing handover from the first RAN to the second RAN, sends a HO completion message to the second RAN.

The HO confirmation unit 704 is configured to receive a HO confirmation message sent by the second RAN element.

Those skilled in the art should know that functions realized by each unit in the HO device shown in FIG. 7 may be understood with reference to related descriptions about the HO method. The functions of each unit in the HO device shown in FIG. 7 may be realized through a program running in a processor, and may also be realized through a specific logical circuit.

When being implemented in form of software functional module and sold or used as an independent product, the HO device of the embodiments of the disclosure may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a computer device (which may be a personal computer, a server, a network device or the like) to execute all or part of the method in each embodiment of the disclosure. The storage medium includes: various media capable of storing program codes such as a U disk, a mobile hard disk, a Read Only Memory (ROM), a magnetic disk or an optical disk. Therefore, the embodiments of the disclosure are not limited to any specific hardware and software combination.

Correspondingly, the embodiments of the disclosure also provide a computer storage medium, in which computer-executable instructions are stored, the computer-executable instructions being executed by a processor to implement the HO method of the embodiments of the disclosure.

Figure 8:
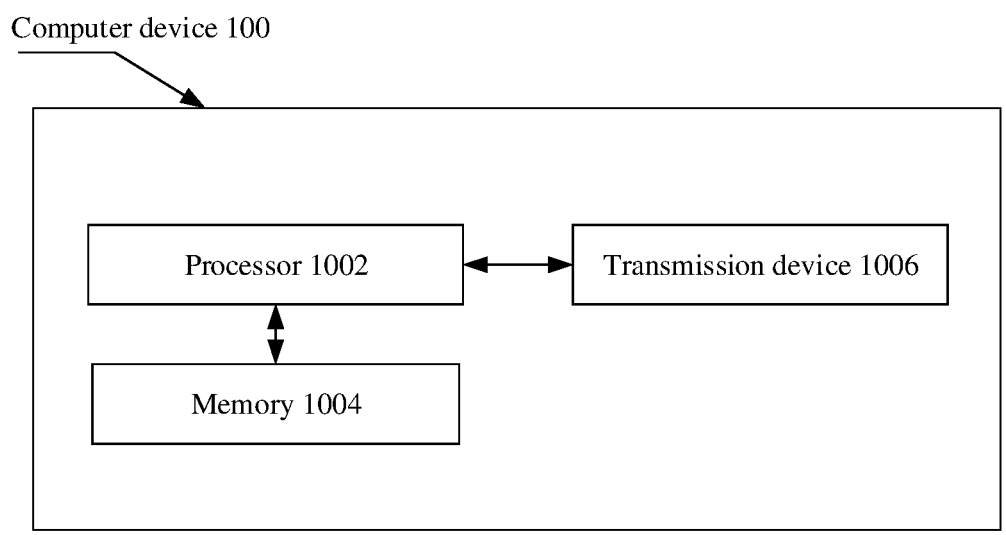
FIG. 8 illustrates a structure composition diagram of a computer device according to embodiments of the disclosure.

FIG. 8 is a structure diagram of a computer device according to embodiments of the disclosure. The computer device may be UE and may also be a network device. As shown in FIG. 8, the computer device 100 may include one or more (only one is illustrated in the figure) processors 1002 (the processor 1002 may include, but not limited to, a processing device such as a Micro Control Unit (MCU) or a Field Programmable Gate Array (FPGA)), a memory 1004 configured to store data and a transmission device 1006 configured for a communication function. Those of ordinary skill in the art should know that the structure shown in FIG. 8 is only schematic and not intended to limit the structure of the electronic device. For example, the computer device 100 may further include components more or fewer than the components shown in FIG. 8 or has a configuration different from that shown in FIG. 8.

The memory 1004 may be configured to store software programs of application software and modules, for example, program instructions/modules corresponding to a method in the embodiments of the disclosure. The processor 1002 runs the software programs and modules stored in the memory 1004, thereby executing various functional applications and data processing, namely implementing the abovementioned method. The memory 1004 may include a high-speed random access memory and may also include a nonvolatile memory, for example, one or more magnetic storage devices, flash memories or other nonvolatile solid-state memories. In some examples, the memory 1004 may further include a memory arranged remotely relative to the processor 1002 and the remote memory may be connected to the computer device 100 through a network. An example of the network includes, but not limited to, the Internet, an intranet, a local area network, a mobile communication network and a combination thereof.

The transmission device 1006 is configured to receive or send data through a network. A specific example of the network may include a wireless network provided by a communication provider of the computer device 100. In an example, the transmission device 1006 includes a Network Interface Controller (NIC), which may be connected with another network device through a base station, thereby communicating with the Internet. In an example, the transmission device 1006 may be a Radio Frequency (RF) module, configured to communicate with the Internet in a wireless manner. In some examples, the transmission device may be a transceiver.

The technical solutions recorded in the embodiments of the disclosure may be freely combined in case of no conflict.

In some embodiments provided by the disclosure, it is to be understood that the disclosed method and intelligent device may be implemented in another manner. The device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part of all of the units may be selected according to a practical requirement to achieve the purposes of the solutions of the embodiments.

In addition, each functional unit in each embodiment of the disclosure may be integrated into a second processing unit, each unit may also serve as an independent unit and two or more than two units may also be integrated into a unit. The integrated unit may be implemented in a hardware form and may also be implemented in form of hardware and software functional unit.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure.

The invention claimed is:

1. A handover (HO) method, comprising:
   determining, by a first Radio Access Network (RAN) element according to first information or a received first message, to keep, during a process of a handover of a User Equipment (UE) from a first RAN to a second RAN, a connection between the first RAN and a first Core Network (CN); and
   receiving, by the first RAN element, data of the UE forwarded by a second RAN element, and sending, by the first RAN element, the data to a first CN element,
   wherein determining, by the first RAN element according to the received first message, to keep, during the process of the handover of the UE from the first RAN to the second RAN, the connection between the first RAN and the first CN comprises:
   sending, by the first RAN element, a second HO request message, the second HO request message containing instruction information for instructing the connection between the first RAN and the first CN to be kept during the process of the handover of the UE from the first RAN to the second RAN, such that the second CN confirms the second HO request message and feeds back a HO request acknowledgment message; and
   determining, by the first RAN element, based on the HO request acknowledgment message, to keep, during the process of the handover of the UE from the first RAN to the second RAN, the connection between the first RAN and the first CN.

2. The method of claim 1, wherein determining, by the first RAN element according to the first information, to keep, during the process of the handover of the UE from the first RAN to the second RAN, the connection between the first RAN and the first CN comprises:
   determining, by the first RAN element, according to at least one of capability information of the UE or capability information of the second RAN element, to keep, during the process of handover of the UE from the first RAN to the second RAN, the connection between the first RAN and the first CN.

3. The method of claim 1, wherein determining, by the first RAN element according to the received first message, to keep, during the process of the handover of the UE from the first RAN to the second RAN, the connection between the first RAN and the first CN comprises:
   sending, by the first RAN element, a first HO request message such that the first CN element or a second CN element determines, according to a service type of the UE, to keep, during the process of the handover of the UE from the first RAN to the second RAN, the connection between the first RAN and the first CN; and
   determining, by the first RAN element based on a HO feedback message from the first CN element or the second CN element, to keep, during the process of the handover of the UE from the first RAN to the second RAN, the connection between the first RAN and the first CN.

4. The method of claim 3, wherein determining, by the first CN element or the second CN element according to the service type of the UE, to keep, during the process of the handover of the UE from the first RAN to the second RAN, the connection between the first RAN and the first CN comprises:
   determining to keep, during the process of the handover of the UE from the first RAN to the second RAN, the connection between the first RAN and the first CN, in response to that the first CN element or the second CN element determines that the second CN element does not support the service type of the UE.

5. The method of claim 3, wherein, if the first CN element determines, according to the service type of the UE, to keep, during the process of the handover of the UE from the first RAN to the second RAN, the connection between the first RAN and the first CN,
   sending, by the first RAN element, the first HO request message comprises:
   sending, by the first RAN element, the first HO request message to the first CN element.

6. The method of claim 3, wherein, if the second CN element determines, according to the service type of the UE, to keep, during the process of the handover of the UE from the first RAN to the second RAN, the connection between the first RAN and the first CN,
   sending, by the first RAN element, the first HO request message comprises:
   sending, by the first RAN element, the first HO request message to the second CN element; or
   sending, by the first RAN element through the first CN element, the first HO request message to the second CN element.

7. The method of claim 1, wherein sending, by the first RAN element, the second HO request message comprises:
   sending, by the first RAN element, the second HO request message to the second CN element; or
   sending, by the first RAN element through the second RAN element, the second HO request message to the second CN element.

8. The method of claim 1, wherein the HO request acknowledgment message contains a resource allocated to the UE by the second RAN element.

9. The method of claim 1, further comprising:
   sending, by the first RAN element, a HO command to the UE, wherein the UE, after completing handover from the first RAN to the second RAN, sends a HO completion message to the second RAN; and
   receiving, by the first RAN element, a HO confirmation message sent by the second RAN element.

10. A handover (HO) device, comprising: a processor, a memory configured to store data and a transceiver configured for a communication function, wherein
    the processor is configured to determine, according to first information or a received first message, to keep, during a process of a handover of a User Equipment (UE) from a first Radio Access Network (RAN) to a second RAN, a connection between the first (RAN and a first Core Network (CN); and the transceiver is configured to receive data of the UE forwarded by a second RAN element, and send the data to a first CN element, wherein the processor is specifically configured to:

send a second HO request message, the second HO request message containing instruction information for instructing the connection between the first RAN and the first CN to be kept during the process of the handover of the UE from the first RAN to the second RAN, such that the second CN confirms the second HO request message and feeds back a HO request acknowledgment message, and determine, based on the HO request acknowledgment message, to keep, during the process of the handover of the UE from the first RAN to the second RAN, the connection between the first RAN and the first CN.

11. The device of claim 10, wherein the processor is specifically configured to:

determine, according to at least one of capability information of the UE or capability information of the second RAN element, to keep, during the process of the handover of the UE from the first RAN to the second RAN, the connection between the first RAN and the first CN.

12. The device of claim 10, wherein the processor is specifically configured to:

send a first HO request message such that the first CN element or a second CN element determines, according to a service type of the UE, to keep, during the process of the handover of the UE from the first RAN to the second RAN, the connection between the first RAN and the first CN, and determine, based on a HO feedback message from the first CN element or the second CN element, to keep, during the process of the handover of the UE from the first RAN to the second RAN, the connection between the first RAN and the first CN.

13. The device of claim 12, wherein the operation that the first CN element or the second CN element determines, according to the service type of the UE, to keep, during the process of the handover of the UE from the first RAN to the second RAN, the connection between the first RAN and the first CN comprises that:

in response to that the first CN element or the second CN element determines that the second CN element does not support the service type of the UE, the connection between the first RAN and the first CN is determined to be kept during the process of the handover of the UE from the first RAN to the second RAN.

14. The device of claim 12, wherein, if the first CN element determines, according to the service type of the UE, to keep, during the process of the handover of the UE from the first RAN to the second RAN, the connection between the first RAN and the first CN, the processor is further configured to send the first HO request message to the first CN element.

15. The device of claim 12, wherein, if the second CN element determines, according to the service type of the UE to keep, during the process of the handover of the UE from the first RAN to the second RAN, the connection between the first RAN and the first CN, the processor is further configured to send the first HO request message to the second CN element or send, through the first CN element, the first HO request message to the second CN element.

16. The device of claim 10, wherein the processor is further configured to send the second HO request message to the second CN element or send, through the second RAN element, the second HO request message to the second CN element.

17. The device of claim 10, wherein the HO request acknowledgment message contains a resource allocated to the UE by the second RAN element.

18. A non-transitory computer storage medium, in which computer-executable instructions are stored, the computer-executable instructions being executed by a processor to implement the following operations:

determining, according to first information or a received first message, to keep, during a process of a handover of a User Equipment (UE) from a first Radio Access Network (RAN) element to a second RAN, a connection between the first RAN and a first Core Network (CN); and receiving data of the UE forwarded by a second RAN element, and sending the data to a first CN element, wherein determining, by the first RAN element according to the received first message, to keep, during the process of the handover of the UE from the first RAN to the second RAN, the connection between the first RAN and the first CN comprises:

sending, by the first RAN element, a second HO request message, the second HO request message containing instruction information for instructing the connection between the first RAN and the first CN to be kept during the process of the handover of the UE from the first RAN to the second RAN, such that the second CN confirms the second HO request message and feeds back a HO request acknowledgment message; and determining, by the first RAN element, based on the HO request acknowledgment message, to keep, during the process of the handover of the UE from the first RAN to the second RAN, the connection between the first RAN and the first CN.

* * * * *